(12) United States Patent
Farrell et al.

(10) Patent No.: US 8,166,121 B2
(45) Date of Patent: Apr. 24, 2012

(54) SITUATION BASED PRESENCE NOTIFICATION LEVERAGING

(75) Inventors: Colm Farrell, Dublin (IE); Liam Harpur, Dublin (IE); Fred Raguillat, Meath (IE); Patrick J. O'Sullivan, Dublin (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 12/650,645

(22) Filed: Dec. 31, 2009

(65) Prior Publication Data

US 2011/0161434 A1 Jun. 30, 2011

(51) Int. Cl.
G06F 15/16 (2006.01)

(52) U.S. Cl. ........ 709/206; 709/204; 709/205; 709/207; 705/7.12; 705/7.13; 705/7.15; 705/7.16; 705/7.17; 705/7.18; 705/7.19; 719/312; 719/313

(58) Field of Classification Search ........................ None
See application file for complete search history.

(56) References Cited

U.S. PATENT DOCUMENTS

| | | | | |
|---|---|---|---|---|
| 6,057,841 A * | 5/2000 | Thurlow et al. | ............... | 715/809 |
| 6,442,589 B1 * | 8/2002 | Takahashi et al. | ............ | 709/203 |
| 6,640,230 B1 * | 10/2003 | Doss et al. | ............. | 1/1 |
| 7,406,504 B2 * | 7/2008 | Paul | .............. | 709/206 |
| 7,526,286 B1 * | 4/2009 | Allen, Jr. et al. | ............... | 455/420 |
| 7,587,457 B2 * | 9/2009 | Fujibayashi | .................. | 709/206 |
| 7,599,473 B2 * | 10/2009 | Michael et al. | ................. | 379/76 |
| 7,801,954 B2 * | 9/2010 | Cadiz et al. | .................... | 709/204 |
| 7,844,669 B1 * | 11/2010 | Mohler | .......................... | 709/206 |
| 7,865,556 B2 * | 1/2011 | Kadashevich | ................ | 709/206 |
| 7,899,479 B2 * | 3/2011 | Zhang | .............................. | 455/519 |
| 7,945,612 B2 * | 5/2011 | Raghav et al. | ................ | 709/201 |
| 7,984,105 B2 * | 7/2011 | Griffin | .......................... | 709/206 |
| 2002/0090069 A1 * | 7/2002 | Yaker | .......................... | 379/88.17 |
| 2002/0131565 A1 * | 9/2002 | Scheuring et al. | .......... | 379/88.19 |
| 2002/0152272 A1 * | 10/2002 | Yairi | .............................. | 709/206 |
| 2002/0165749 A1 * | 11/2002 | Northcutt et al. | .................. | 705/8 |
| 2003/0120733 A1 * | 6/2003 | Forman | .......................... | 709/206 |
| 2004/0003030 A1 * | 1/2004 | Abe | .............................. | 709/203 |
| 2005/0047562 A1 * | 3/2005 | Holz et al. | .................. | 379/88.22 |

(Continued)

OTHER PUBLICATIONS

"Email Responder" May 26, 2003, http://www.outlook4team.com/download.asp?catID=17.

Primary Examiner — Backhean Tiv
(74) Attorney, Agent, or Firm — Law Office of Jim Boice

(57) ABSTRACT

Presence messages are managed for one or more members of a pre-defined group of e-mail users. An unavailability time period, during which a pre-defined group of e-mail users will be unavailable in the future, is established. A notice, which notifies the pre-defined group of e-mail users that an unavailability control instruction will be sent in the future to participating members of the group of e-mail users, is transmitted to the group of e-mail users. An acceptance signal, identifying the participating members, is received, indicating which members of the group of e-mail users agree to permit the unavailability control instruction to be received and implemented on their participating computers in the future. The unavailability control instruction is then transmitted to the participating computers at an initiation of the unavailability time period, in order to auto-generate an appropriate presence message for the participating members.

16 Claims, 5 Drawing Sheets

U.S. PATENT DOCUMENTS

| | | |
|---|---|---|
| 2005/0076090 A1* | 4/2005 | Thuerk .................... 709/207 |
| 2005/0102368 A1* | 5/2005 | Forman et al. ............. 709/207 |
| 2005/0164151 A1* | 7/2005 | Klein ...................... 434/304 |
| 2006/0069580 A1* | 3/2006 | Mason et al. ................. 705/1 |
| 2006/0075038 A1* | 4/2006 | Mason et al. ............. 709/206 |
| 2006/0168045 A1* | 7/2006 | Pickover .................. 709/206 |
| 2006/0168062 A1* | 7/2006 | Hebert et al. ............. 709/206 |
| 2006/0195363 A1* | 8/2006 | Heron et al. ................ 705/26 |
| 2006/0212330 A1* | 9/2006 | Savilampi .................... 705/8 |
| 2007/0081640 A1* | 4/2007 | Jachner ................. 379/88.16 |
| 2007/0192419 A1* | 8/2007 | Vuong et al. ............. 709/206 |
| 2007/0291911 A1* | 12/2007 | Visser .................. 379/88.13 |
| 2008/0002820 A1* | 1/2008 | Shtiegman et al. ...... 379/211.02 |
| 2008/0040177 A1* | 2/2008 | Vuong et al. ................ 705/8 |
| 2008/0059493 A1 | 3/2008 | Blohm |
| 2008/0065755 A1 | 3/2008 | Caspi et al. |
| 2008/0104177 A1* | 5/2008 | Keohane et al. ........... 709/206 |
| 2008/0120386 A1* | 5/2008 | Piccinini et al. ........... 709/206 |
| 2008/0127204 A1* | 5/2008 | Dai et al. .................. 719/313 |
| 2008/0133302 A1* | 6/2008 | Brauninger et al. ........... 705/8 |
| 2008/0133708 A1 | 6/2008 | Alvarado et al. |
| 2008/0140665 A1 | 6/2008 | Ariel et al. |
| 2008/0155026 A1* | 6/2008 | Daniels-Farrar et al. ..... 709/206 |
| 2008/0177850 A1* | 7/2008 | Piccinini et al. ........... 709/206 |
| 2008/0183814 A1 | 7/2008 | Sanghavi |
| 2008/0263162 A1* | 10/2008 | Staiman et al. ............ 709/206 |
| 2008/0294482 A1* | 11/2008 | Bank et al. ..................... 705/8 |
| 2009/0006557 A1* | 1/2009 | Florkey et al. ............. 709/206 |
| 2009/0010400 A1* | 1/2009 | Amin .................... 379/88.13 |
| 2009/0077183 A1* | 3/2009 | Bruce et al. ............... 709/206 |
| 2009/0113001 A1* | 4/2009 | Manning et al. ............ 709/206 |
| 2009/0150500 A1* | 6/2009 | Kumar et al. .............. 709/206 |
| 2009/0198783 A1* | 8/2009 | Bloomer et al. ............ 709/206 |
| 2009/0228806 A1* | 9/2009 | Kadashevich et al. ........ 715/747 |
| 2009/0259718 A1* | 10/2009 | O'Sullivan et al. ......... 709/204 |
| 2009/0307323 A1* | 12/2009 | Kato et al. ................ 709/206 |
| 2010/0105359 A1* | 4/2010 | Bocking et al. ............ 455/412.1 |
| 2010/0146059 A1* | 6/2010 | Dellafera et al. ........... 709/206 |
| 2010/0169429 A1* | 7/2010 | O'Sullivan et al. ......... 709/206 |
| 2010/0198921 A1* | 8/2010 | Choi et al. ................ 709/206 |
| 2010/0250682 A1* | 9/2010 | Goldberg et al. ........... 709/206 |
| 2010/0318615 A1* | 12/2010 | Griffin ..................... 709/206 |
| 2011/0004503 A1* | 1/2011 | Farrell et al. .................. 705/9 |
| 2011/0010447 A1* | 1/2011 | Fox et al. .................. 709/224 |
| 2011/0047558 A1* | 2/2011 | Agulnik et al. ............. 719/318 |
| 2011/0087742 A1* | 4/2011 | Deluca et al. .............. 709/206 |
| 2011/0137992 A1* | 6/2011 | Michel et al. .............. 709/204 |
| 2011/0161434 A1* | 6/2011 | Farrell et al. .............. 709/206 |
| 2011/0185006 A1* | 7/2011 | Raghav et al. ............. 709/201 |

* cited by examiner

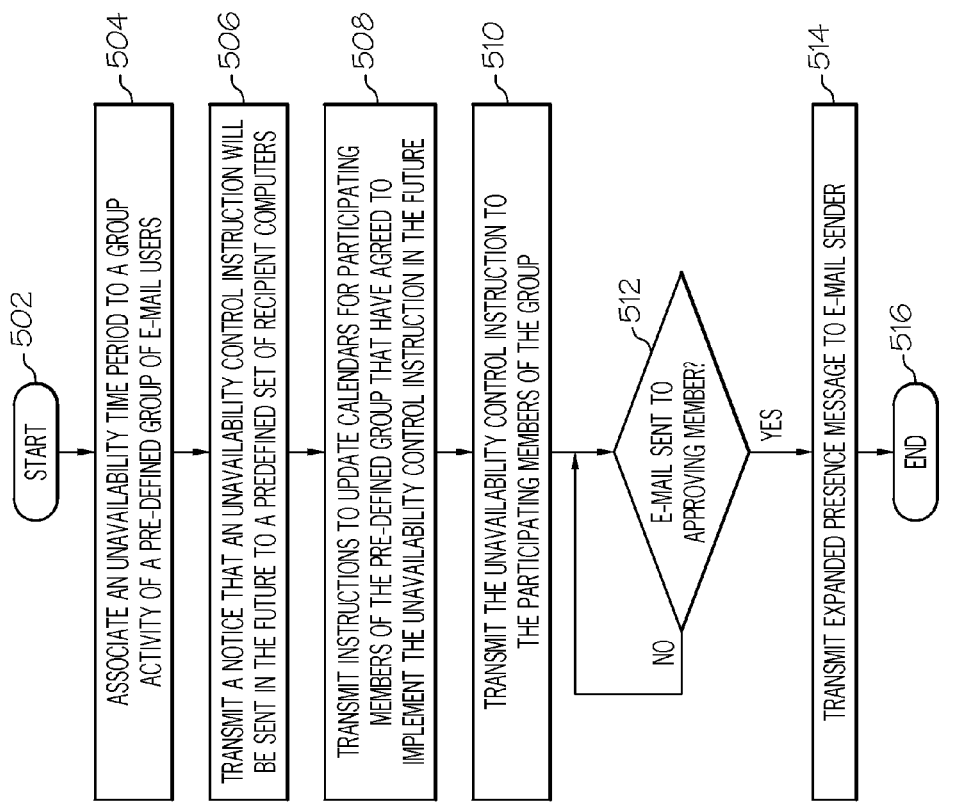

SITUATION BASED PRESENCE NOTIFICATION LEVERAGING

BACKGROUND

The present disclosure relates to the field of computers, and specifically to messages between computers. Still more particularly, the present disclosure relates to notification messages related to users' presence conditions.

BRIEF SUMMARY

A computer-implemented method, system, and computer program product for managing presence messages for a pre-defined group of e-mail users is presented. An unavailability time period, during which a pre-defined group of e-mail users will be unavailable in the future, is established. A notice, which notifies the pre-defined group of e-mail users that an unavailability control instruction will be sent in the future to participating members of the group of e-mail users, is transmitted to the group of e-mail users. An acceptance signal, identifying the participating members, is received, indicating which members of the group of e-mail users agree to permit the unavailability control instruction to be received and implemented on their participating computers in the future. The unavailability control instruction is then transmitted to the participating computers at an initiation of the unavailability time period, in order to auto-generate an appropriate presence message for the participating members.

BRIEF DESCRIPTION OF THE SEVERAL VIEWS OF THE DRAWINGS

FIG. 5 is a high-level flow-chart of exemplary acts performed by a computer to leverage situational notification status messages.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
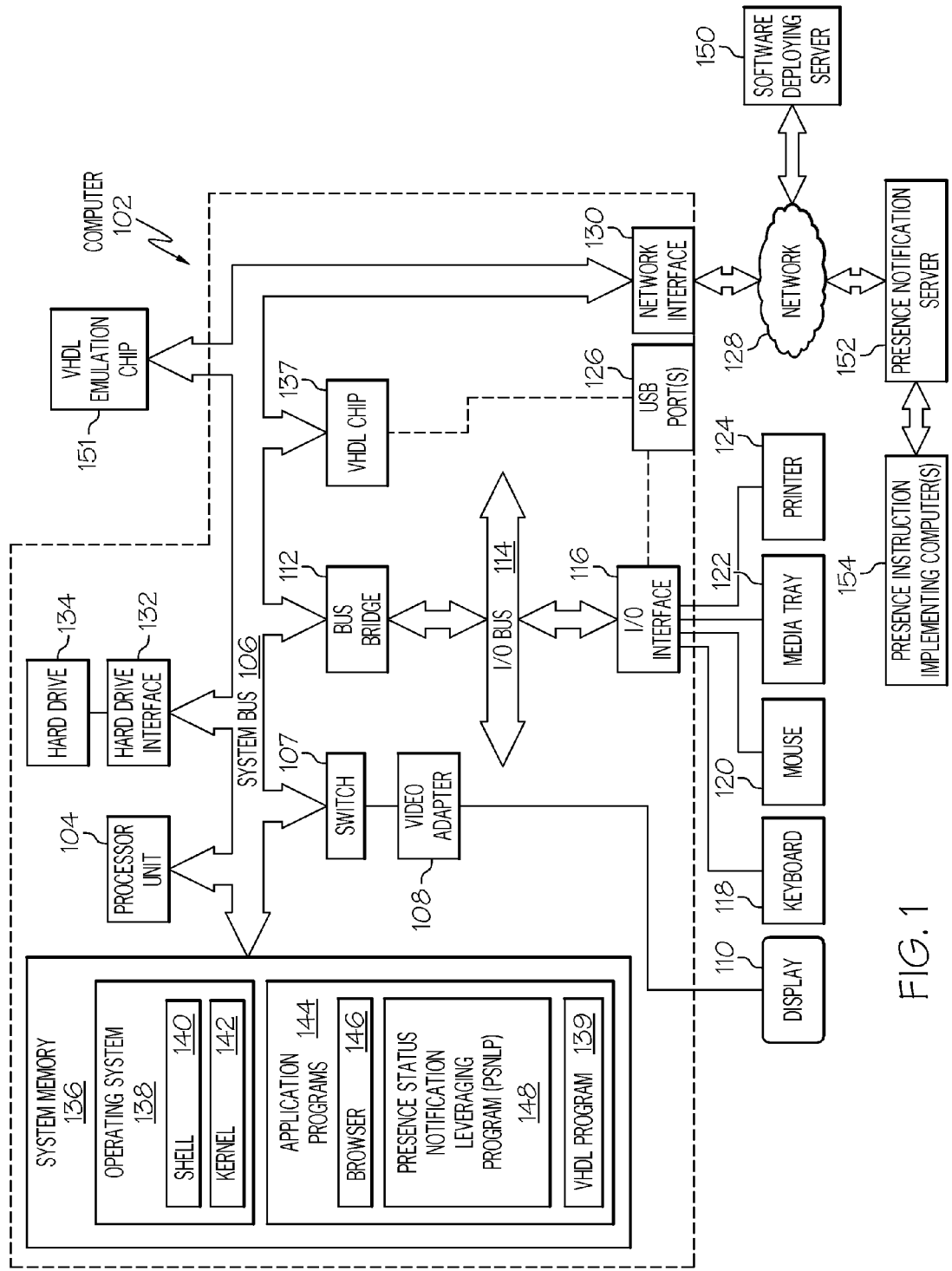
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, presence notification server 152, and/or other presence instruction implementing computer(s) 154. Similarly, the architecture depicted for computer 102 may be utilized by presence instruction requesting computer 202, presence notification server 206, presence instruction receiving computers 208a-n, e-mail transmitting computer 212, and/or manager's computer 222 shown below in FIG. 2.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., presence status notification leveraging program—PSNLP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150, status notification server 152, and/or other status message implementing computer(s) 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a presence status notification leveraging program (PSNLP) 148. PSNLP 148 includes code for implementing the processes described below, including those described in FIGS. 2-5. In one embodiment, computer 102 is able to download PSNLP 148 from software deploying server 150, including in an on-demand basis, such that the code from PSNLP 148 is not downloaded until runtime or otherwise immediately needed by computer 102. Note further that, in one embodiment of the present disclosure, software deploying server 150 performs all of the functions associated with the present disclosure (including execution of PSNLP 148), thus freeing computer 102 from having to use its own internal computing resources to execute PSNLP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from PSNLP 148 causes VHDL program 139 to configure VHDL chip 137, which may be an FPGA, ASIC, etc.

In another embodiment of the present disclosure, execution of instructions from PSNLP 148 results in a utilization of VHDL program 139 to program a VHDL emulation chip 151. VHDL emulation chip 151 may incorporate a similar architecture as described above for VHDL chip 137. Once PSNLP 148 and VHDL program 139 program VHDL emulation chip 151, VHDL emulation chip 151 performs, as hardware, some or all functions described by one or more executions of some or all of the instructions found in PSNLP 148. That is, the VHDL emulation chip 151 is a hardware emulation of some or all of the software instructions found in PSNLP 148. In one embodiment, VHDL emulation chip 151 is a programmable read only memory (PROM) that, once burned in accordance with instructions from PSNLP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
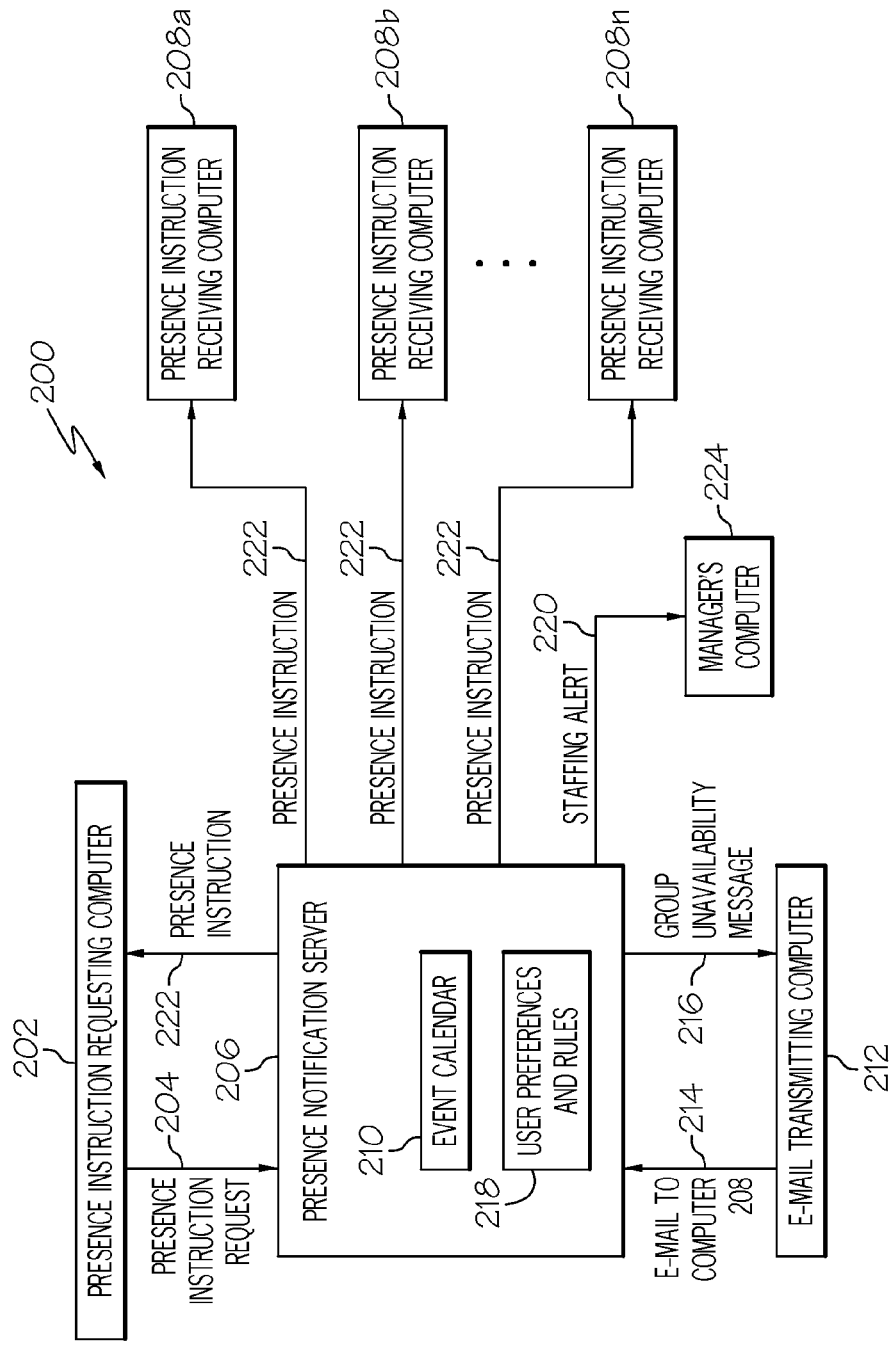
FIG. 2 illustrates an exemplary network in which situational notification status messages can be leveraged.

With reference now to FIG. 2, depicted is an exemplary network 200 in which actions, responsive to e-messages, can be leveraged. Assume that a presence instruction requesting computer 202 transmits a presence instruction request 204 to a presence notification server 206. This presence instruction request 204 is a request that leveraged presence messages be auto-generated in the future by one or more of presence instruction receiving computers 208a-n (where "n" is an integer), as well as by presence instruction requesting computer 202 itself. As will be described in further detail below, presence instruction request 204 results in a presence instruction 222 being sent to any participating computer, including computers 202 and 208a-n. Presence instruction 222 directs a recipient computer to auto-generate a presence status message (e.g., "Out Of Office") in response to receiving an e-mail message from an e-mail transmitting computer 212. The presence instruction 222 may be customized by the presence notification server 206. In one embodiment, this customization is performed by consulting an event calendar 210. For example, assume that the presence instruction request 204 is for an "Out Of Office" (OOO) message to be auto-generated while a group is at a company picnic next year. Rather than each computer user (e.g., of computers 208a-n) having to know when that picnic will occur, and then remembering to enter the auto-generated OOO message, logic within the presence notification server 206 will consult with the event calendar 210, and customize the presence instruction 222 accordingly. Similarly, the presence notification server 206 can consult with a set of user preferences and rules 218 in order to customize the presence instruction 222. These preferences and rules 218 may define what prior notice is given forewarning that the auto-generated messages will be generated, how much prior notice (i.e., how much lead time) is given, who receives the notice, etc. Consultation of the preferences and rules 218 by the presence notification server 206 can also result in a staffing alert 220 being sent to a manager's computer 224. This staffing alert 220 will notify a manager that a particular project will be adversely affected by one or more users being away at an event (reflected in the presence instruction 222) in the future.

In addition to the presence instruction 222 auto-generating OOO messages, a group unavailability message 216 can also result from the presence instruction request 204 to the presence notification server 206. For example, assume that an e-mail transmitting computer 212 sends an e-mail to one of the participating computers (e.g., 208a-n). If a single user of that one participating computer is OOO, then the group unavailability message 216 will not only let the e-mail transmitting computer 212 know that single user is unavailable, but will also let it know which other users of other participating computers are unavailable (OOO).

Figure 3:
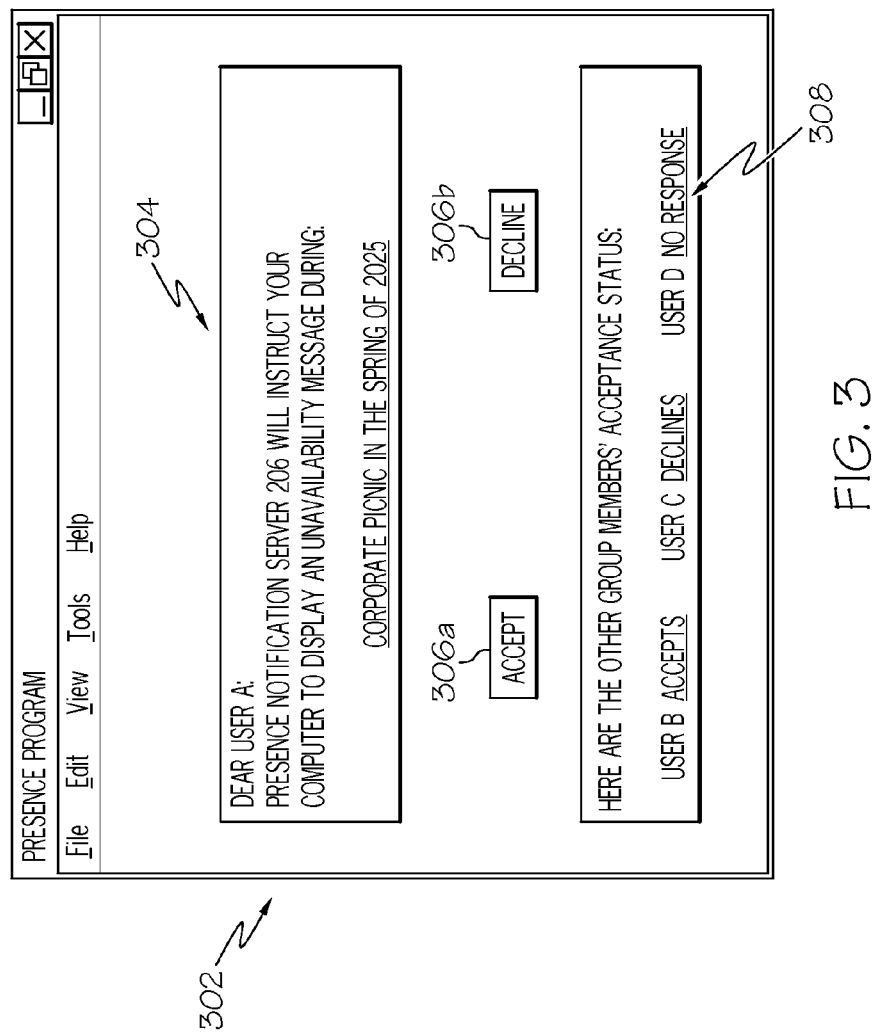
FIG. 3 depicts an exemplary GUI that is displayed to users of the leveraged situational notification status messages.

In order to understand what a "participating computer" is, refer now to FIG. 3. Assume that a graphical user interface 302 is presented on computer 202 shown in FIG. 2. Also assume that the user of computer 202 is "User A". User A receives a message 304, notifying him that a presence instruction 222 (shown in FIG. 2) will be sent to his computer at the beginning of the corporate picnic in the spring of 2025. This presence instruction 222 will auto-generate an OOO message at User A's computer during that period. If User A wishes to allow his computer to participate in this OOO message auto-generation, then he clicks button 306a. If User A does not wish to participate, then he clicks 306b. Assume also that User A is part of a pre-defined group of e-mail users, which includes Users B-D. As depicted in window 308, User B will also get an OOO message depicted during the 2025 picnic, while User C will not (presumably because User C will not be attending the 2025 picnic). User D still has not made up his mind as to whether he wants to attend and/or have an OOO message auto-generated on his computer.

Figure 4:
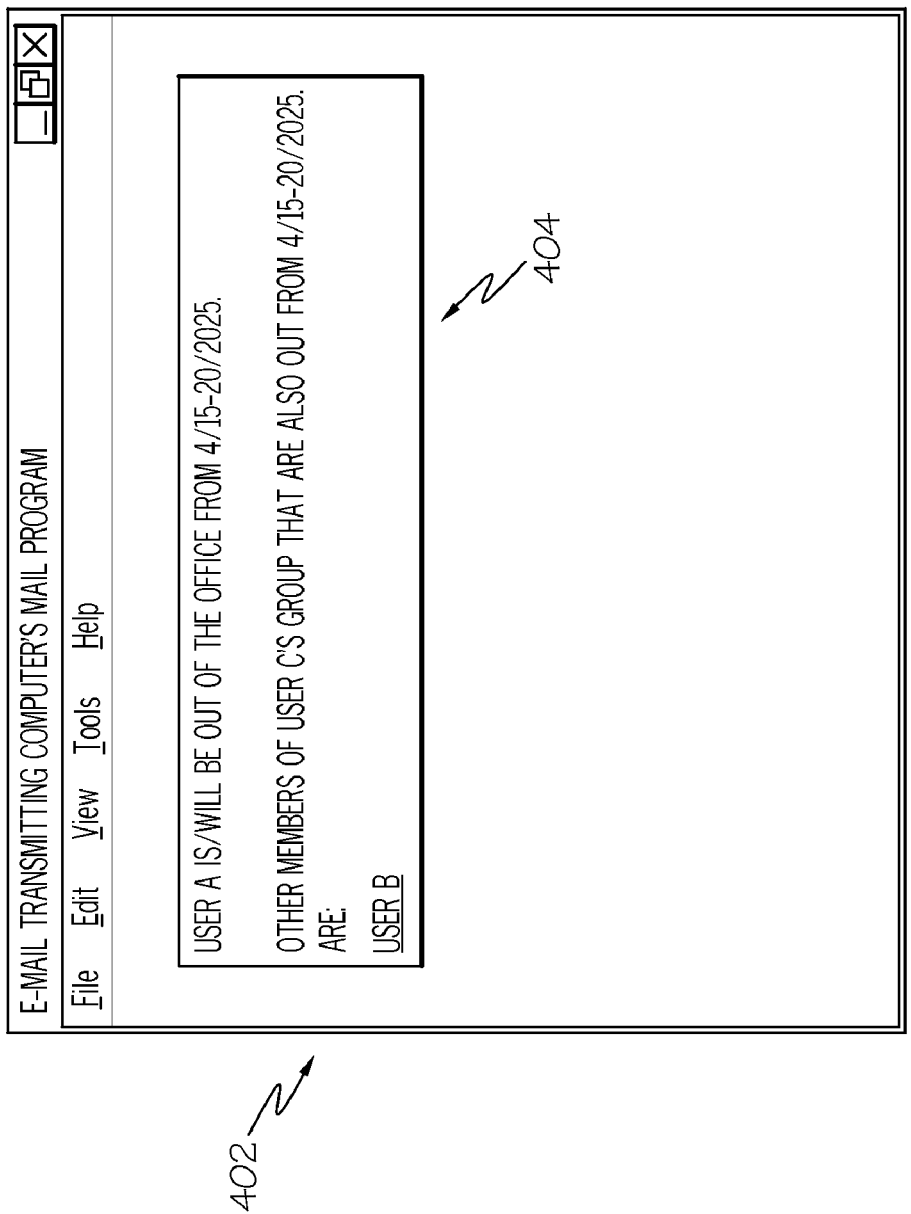
FIG. 4 illustrates an exemplary GUI that displays an Out Of Office (OOO) message to an e-mail transmitting computer.

With reference now to FIG. 4, an exemplary GUI 402, depicting an expanded unavailability message 404 (i.e., the group unavailability message 216 illustrated in FIG. 2), is presented. GUI 402 is displayed on the e-mail transmitting computer 212 in response to an e-mail being sent to one of the participating users/computers described above. Note that the e-mail sender is notified not only that the intended recipient (User A) is OOO, but User B (from the same pre-defined group of which User A is a member) is also OOO.

Note that the process described above is server-based, in which the presence notification server 206 orchestrates the operations. In another embodiment, the process is client-based. For example, if presence instruction receiving computer 208a receives an e-mail or chat window, which contains an upcoming OOO notice, then computer 208a can automatically transmit that same upcoming OOO notice to presence instruction receiving computer 208b, since the users of 208a and 208b are both in a same group to which the OOO notice applies. This automatic forwarding of the OOO notice is thus transparent to the user of 208a.

Referring now to FIG. 5, a high-level flow-chart of one or more exemplary steps taken by a processor to leverage presence messages is presented. After initiator block 502, an unavailability time period during which a pre-defined group of e-mail users will engage in a group activity in the future is established (block 504). As described in block 506, a notice is transmitted to the pre-defined group of e-mail users, wherein the notice notifies the pre-defined group of e-mail users that an unavailability control instruction will be sent in the future to participating members of the pre-defined group of e-mail users. This unavailability control instruction will automatically cause computers of the participating members to each auto-reply to incoming e-mail messages with a same copy of a pre-defined unavailability message. These participating members are identified by an acceptance signal from the participating members. As described above in FIG. 3, the acceptance signal is transmitted from members, of the pre-defined group of pre-defined e-mail users, who agree to permit the unavailability control instruction to be received and implemented on their participating computers in the future.

With reference to block 508, in one embodiment instructions are then transmitted, from the presence server to user clients, causing a schedule calendar for all of the participating members to be automatically adjusted in conformance with the pre-defined unavailability message. As described in block 510, the unavailability control instruction is then transmitted to the participating computers at an initiation of the unavailability time period. In response to an e-mail being sent to a participating computer during the unavailability time period (query block 512), the unavailability control instruction causes at least one of the participating computers to auto-generate an appropriate presence message (block 514). Note that in one embodiment, the e-mail may be sent to both approving (participating) computers/members of the group, as well as non-approving (non-participating) computers/users. However, the e-mail sent to the participating computers will include embedded logic for causing the participating computer to issue an OOO notice (and to adjust the local schedule calendar), while the version of the e-mail sent to non-participating computers will not include this embedded logic. Thus, a non-participating user will be advised of the impending OOO notice for another user, but will not have this OOO notice auto-generated on her computer. This difference capitalizes on a preferred embodiment of the present disclosure, in which the extensibility of protocols used by simple mail transfer protocol (SMTP) for e-mail, calendaring and scheduling allow the utilization of two cooperating host and destination systems, one for e-mail content and one for auto-generation of OOO notices and their associated calendaring and scheduling. The process ends at terminator block 516.

As described above, in one embodiment of the present disclosure, the e-mail transmitting computer sent the e-mail message to only a first member of the participating members. Nonetheless, the group unavailability message describes an unavailability presence status of all of the participating members.

In one embodiment of the present disclosure, the group unavailability message is associated with a set of user preferences and rules as described above, resulting in the auto-generation of an expanded unavailability message based on the set of user preferences and rules. In one embodiment, this expanded unavailability message provides directions to an e-mail sender for contacting alternate recipients in accordance with skill sets held by the alternate recipients. For example, the expanded unavailability message (OOO) may direct the e-mail sender to call 555-555-5555 if she needs technical support, or to call 555-555-6666 if she needs billing information.

In one embodiment of the present disclosure, when one member of a group agrees to participate in the auto-generation of an OOO or similar type message, this decision is transmitted to all other members of his group. This acceptance message may be amalgamated by the presence server such that it contains a listing of all accepting/participating clients/users. In one embodiment of the present disclosure, a period of time is adjusted between the notice and the transmitting of the unavailability control instruction according to a relationship between two members from the participating members, wherein the relationship is defined in a set of user preferences and rules. For example, assume that User A and User B, from a same group, work closely together. If User A has agreed to be OOO during the company picnic, then he probably doesn't need to let User B know until just before the picnic. However, if User A and User B do not work closely together, then User A would want to give User B more lead time, such that User B will know well in advance that User A will be attending the picnic.

In one embodiment of the present invention, a staffing alert is transmitted to a manager when the number of participating members of the group reaches a pre-determined threshold, and/or when the OOO-causing event (e.g., the picnic) occurs (and thus the presence instruction 222 shown in FIG. 2 is transmitted). This staffing alert informs the manager that the participating members will be unavailable during the unavailability time period, and thus the participating members' absence will result, according to a project plan, in a project being understaffed.

In one embodiment of the present invention, the group activity that causes the leveraged OOO-type message to be generated is a known calendar holiday. In another embodiment, the group activity is an out-of-office activity (recreational, work, travel, etc.) of the pre-defined group of e-mail users.

In one embodiment, if it is determined that the group activity temporally conflicts (i.e., two events are scheduled at the same time) with an earlier commitment for the pre-defined group of e-mail users, then the unavailability control instruction is deleted, since the participating users will presumably honor the previous commitment.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer-implemented method of managing presence messages, the computer-implemented method comprising:

a presence notification server receiving, from a presence instruction requesting computer, a presence instruction request;

in response to the receiving the presence instruction request, the presence notification server transmitting a notice to a receiving e-mail user that an unavailability control instruction will be sent, in the future, to an e-mail receiving computer that is used by the receiving e-mail user, wherein the unavailability control instruction will automatically cause the receiving e-mail computer to auto-reply to incoming e-mail messages with a pre-defined unavailability message during an unavailability time period, and wherein the presence instruction requesting computer and the e-mail receiving computer are separate computers that have different users;

the presence notification server receiving an acceptance signal identifying the receiving e-mail user, wherein the acceptance signal is an agreement to permit the unavailability control instruction to be received and implemented in the future on the e-mail receiving computer; and the presence notification server transmitting the unavailability control instruction to the e-mail receiving computer at an initiation of the unavailability time period, wherein the unavailability control instruction causes the e-mail receiving computer to auto-generate the pre-defined unavailability message in response to receiving an e-mail message from an e-mail transmitting computer;

transmitting the notice to a pre-defined group of e-mail users; and receiving the acceptance signal from participating members of the pre-defined group of e-mail users, wherein the pre-defined group of e-mail users includes the receiving e-mail user, wherein the participating members agree to permit the unavailability control instruction to be received and implemented in the future to generate a group unavailability message on their respective e-mail receiving computers, wherein the e-mail message is sent to only a first member of the participating members, and wherein the group unavailability message describes an unavailability presence status of all of the participating members in response to the e-mail message being received by the first member of the participating members.

2. The computer-implemented method of claim 1, further comprising: associating the group unavailability message to a set of user preferences and rules; auto-generating an expanded unavailability message based on the set of user preferences and rules, wherein the expanded unavailability message provides directions to an e-mail sender for contacting alternate recipients in accordance with skill sets held by the alternate recipients; and transmitting the expanded unavailability message to the e-mail sender.

3. The computer-implemented method of claim 1, further comprising: transmitting an acceptance message to all members of the pre-defined group of e-mail users, wherein the acceptance message describes which members of the pre-defined group of e-mail users are participating members.

4. The computer-implemented method of claim 1, further comprising: adjusting a period of time between transmitting the notice and transmitting the unavailability control instruction according to a relationship between two members from the participating members, wherein the relationship is defined in a set of user preferences and rules.

5. The computer-implemented method of claim 1, further comprising: transmitting a staffing alert to a manager, wherein the staffing alert informs the manager that the participating members will be unavailable during the unavailability time period, and wherein said participating members being unavailable will result, according to a project plan, in a project being understaffed.

6. The computer-implemented method of claim 1, further comprising: automatically adjusting a schedule calendar for all of the participating members to comport with schedule information described in the group unavailability message.

7. The computer-implemented method of claim 1, wherein the unavailability time period is during a group activity in which all of the pre-defined group of e-mail users are scheduled to attend.

8. The computer-implemented method of claim 7, further comprising: determining that the group activity temporally conflicts with a previous commitment for the pre-defined group of e-mail users; and deleting the unavailability control instruction in response to said determining.

9. A computer system comprising:
a central processing unit; and
a computer readable memory coupled to the central processing unit, wherein the computer readable memory comprises software which, when executed, causes the central processing unit to implement:
transmitting a notice to a receiving e-mail user that an unavailability control instruction will be sent, in the future, to an e-mail receiving computer that is used by the receiving e-mail user, wherein the unavailability control instruction will automatically cause the receiving e-mail computer to auto-reply to incoming e-mail messages with a pre-defined unavailability message during an unavailability time period;
receiving an acceptance signal identifying the receiving e-mail user, wherein the acceptance signal is an agreement to permit the unavailability control instruction to be received and implemented in the future on the e-mail receiving computer;
transmitting the unavailability control instruction to the e-mail receiving computer at an initiation of the unavailability time period, wherein the unavailability control instruction causes the e-mail receiving computer to auto-generate the pre-defined unavailability message in response to receiving an e-mail message from an e-mail transmitting computer;
transmitting the notice to a pre-defined group of e-mail users; and
receiving the acceptance signal from participating members of the pre-defined group of e-mail users, wherein the pre-defined group of e-mail users includes the receiving e-mail user, wherein the participating members agree to permit the unavailability control instruction to be received and implemented in the future to generate a group unavailability message on their respective e-mail receiving computers, wherein the e-mail message is sent to only a first member of the participating members, and wherein the group unavailability message describes an unavailability presence status of all of the participating members in response to the e-mail message being received by the first member of the participating members.

10. The computer system of claim 9, wherein the software, when executed, further causes the central processing unit to implement: associating the group unavailability message to a set of user preferences and rules; auto-generating an expanded unavailability message based on the set of user preferences and rules, wherein the expanded unavailability message provides directions to an e-mail sender for contacting alternate recipients in accordance with skill sets held by the alternate recipients; and transmitting the expanded unavailability message to the e-mail sender.

11. The computer system of claim 9, wherein the software, when executed, further causes the central processing unit to implement: transmitting an acceptance message to all members of the group, wherein the acceptance message describes which members of the group are participating members.

12. The computer system of claim 9, wherein the software, when executed, further causes the central processing unit to implement: adjusting a period of time between transmitting the notice and transmitting the unavailability control instruction according to a relationship between two members from the participating members, wherein the relationship is defined in a set of user preferences and rules.

13. A computer program product comprising a non-transitory computer readable storage medium embodied therewith, the non-transitory computer readable storage medium comprising:
computer readable program code configured to transmit a notice to a receiving e-mail user that an unavailability control instruction will be sent, in the future, to an e-mail receiving computer that is used by the receiving e-mail user, wherein the unavailability control instruction will automatically cause the receiving e-mail computer to auto-reply to incoming e-mail messages with a pre-defined unavailability message during an unavailability time period;
computer readable program code configured to receive an acceptance signal identifying the receiving e-mail user, wherein the acceptance signal is an agreement to permit the unavailability control instruction to be received and implemented in the future on the e-mail receiving computer; and
computer readable program code configured to transmit the unavailability control instruction to the e-mail receiving computer at an initiation of the unavailability time period, wherein the unavailability control instruction causes the e-mail receiving computer to auto-generate the pre-defined unavailability message in response to receiving an e-mail message from an e-mail transmitting computer;

computer readable program code configured to transmit the notice to a pre-defined group of e-mail users; and computer readable program code configured to receive the acceptance signal from participating members of the pre-defined group of e-mail users, wherein the pre-defined group of e-mail users includes the receiving e-mail user, wherein the participating members agree to permit the unavailability control instruction to be received and implemented in the future to generate a group unavailability message on their respective e-mail receiving computers, wherein the e-mail message is sent to only a first member of the participating members, and wherein the group unavailability message describes an unavailability presence status of all of the participating members in response to the e-mail message being received by the first member of the participating members.

14. The computer program product of claim 13, further comprising: computer readable program code configured to associate the group unavailability message to a set of user preferences and rules; computer readable program code configured to auto-generate an expanded unavailability message based on the set of user preferences and rules, wherein the expanded unavailability message provides directions to an e-mail sender for contacting alternate recipients in accordance with skill sets held by the alternate recipients; and computer readable program code configured to transmit the expanded unavailability message to the e-mail sender.

15. The computer program product of claim 13, further comprising: computer readable program code configured to transmit an acceptance message to all members of the group, wherein the acceptance message describes which members of the group are participating members.

16. The computer program product of claim 13, further comprising: computer readable program code configured to adjust a period of time between transmitting the notice and transmitting the unavailability control instruction according to a relationship between two members from the participating members, wherein the relationship is defined in a set of user preferences and rules.

* * * * *